Patented May 7, 1940

2,199,856

UNITED STATES PATENT OFFICE 2,199,856

REFRACTORY GLASS

John Henry Partridge, Middlesex County, England, assignor to General Electric Company, a corporation of New York No Drawing. Application November 10, 1936, Serial No. 110,184. In Great Britain November 11, 1935

5 Claims. (Cl. 106—36.1)

This invention relates to refractory glasses adapted in particular for the manufacture of the envelopes of high-pressure metal-vapour discharge lamps.

The properties that such glasses must possess are set out in British Patent Specification No. 426,129, which describes also the general principles according to which they may be attained. The particular glasses described there had softening points barely exceeding 900° C. The development of these lamps has now raised a demand for glasses of even higher softening points. The object of the invention is to meet this demand. Raising the softening point necessarily involves raising the founding temperature; but I have found that by a slight modification of the composition, glasses can be obtained with softening points up to 1080° and yet capable of being founded at 1600° C., a temperature which is still within the limits possible with commercial furnaces.

The higher softening point can be attained by modifying the glasses described in the said specification, by decreasing the proportion of lime and increasing the proportion of alumina. But a lower limit to the lime is set at about 10%. For at about this proportion the liquidus curve in the $SiO_2$—$Al_2O_3$—$CaO$ diagram rises very sharply. The discovery on which the invention rests is that, if, in a glass containing about 60% silica, 30% alumina, and 10% lime, part of the lime is replaced by magnesia, baryta, zinc oxide or thoria, then the glass becomes much more easily founded and worked; at the same time the coefficient of thermal expansion is reduced. Thoria is particularly valuable in improving the stability of the glass in the working flame.

According to the invention a glass having a softening temperature not less than 1000° C., and capable of being founded at a temperature of 1600° C., consists of 50–70% of silica, 25–35% of alumina, 6–11% of lime, 1 to 6% of magnesia and/or baryta and/or zinc oxide and/or thoria, and contains substantially no other constituents. It is to be understood that the total of the magnesia, baryta, zinc oxide and thoria is to lie between 1 and 6%; but that this total may be distributed in any suitable manner among these constituents. Softening temperature has the meaning assigned to it in British Patent Specification No. 426,129.

It will be realised by those skilled in the art that it is not asserted that all materials having compositions within the limits stated are capable of existence as glasses or, if they do exist as glasses, have softening temperatures as high as 1000° C. and founding temperatures as low as 1600° C. The knowledge that is general in the art of glass manufacture must be applied to the selection of compositions within the limits stated.

The compositions in the following table are typical of glasses according to the invention. The softening point is denoted by S. P; $\alpha$ is the coefficient of thermal expansion.

|  | $SiO_2$ | $Al_2O_3$ | CaO | BaO | MgO | ZnO | $ThO_2$ | S. P. | $\alpha$ |
|---|---|---|---|---|---|---|---|---|---|
|  |  |  |  |  |  |  |  | ° C. |  |
| V | 65 | 25 | 8 |  | 2 |  |  | 1040 | ? |
| VI | 65 | 25 | 8 | 2 |  |  |  | 1060 | ? |
| VII | 60 | 29 | 8 | 1 | 2 |  |  | 1040 | $3.5 \times 10^{-6}$ |
| VIII | 60 | 29 | 8 |  | 2 | 1 |  | 1040 | 3.5 |
| IX | 60 | 30 | 8 |  |  |  | 2 | 1065 | 3.2 |
| X | 60 | 28 | 10 |  |  |  | 2 | 1044 | 3.6 |
| XI | 60 | 28 | 3 |  |  |  | 4 | 1060 | 3.2 |
| XII | 60 | 28 | 7 | 3 |  |  | 2 | 1070 | 3.2 |

I claim:

1. A glass having a softening point not less than 1000° C. and capable of being founded at a temperature of 1600° C. consisting of 60–70% of silica, 25–35% of alumina, 6–11% of lime, and 1 to 6% of material from the group consisting of magnesia, baryta, zinc oxide and thoria, and containing substantially no other constituents.

2. A glass having a softening point not less than 1000° C. and capable of being founded at a temperature of 1600° C. consisting of about 60 to 65% silica, about 25 to 30% alumina, about 7 to 10% lime and about 2 to 5% of material from the group consisting of magnesia, baryta, zinc oxide and thoria, and containing substantially no other constituents.

3. A glass having a softening point not less than 1000° C. and capable of being founded at a temperature of 1600° C. consisting of about 60% silica, about 28% alumina, about 8 to 10% lime and about 2 to 4% thoria, and containing substantially no other constituents.

4. A glass having a softening point not less than 1000° C. and capable of being founded at a temperature of 1600° C. consisting of about 65% silica, about 25% alumina, about 8% lime and about 2% of magnesia, and containing substantially no other constituents.

5. A glass having a softening point not less than 1000° C. and capable of being founded at a temperature of 1600° C. consisting of about 65% silica, about 25% alumina, and about 8% lime and about 2% of baryta, and containing substantially no other constituents.

JOHN HENRY PARTRIDGE.